US012568954B2

(12) United States Patent
Poplawski

(10) Patent No.: US 12,568,954 B2
(45) Date of Patent: Mar. 10, 2026

(54) DEVICE FOR CONTROLLING UNWANTED WATER-FOWL

(71) Applicant: Daniel Poplawski, Oswego, IL (US)

(72) Inventor: Daniel Poplawski, Oswego, IL (US)

( * ) Notice: Subject to any disclaimer, the term of this patent is extended or adjusted under 35 U.S.C. 154(b) by 722 days.

(21) Appl. No.: 17/541,506

(22) Filed: Dec. 3, 2021

(65) Prior Publication Data

US 2023/0172188 A1 Jun. 8, 2023

(51) Int. Cl.
*A01M 29/16* (2011.01)

(52) U.S. Cl.
CPC .................................. *A01M 29/16* (2013.01)

(58) Field of Classification Search
CPC .............................. A01M 29/16; A01M 31/06
USPC ....................................................... 116/22 A
See application file for complete search history.

(56) References Cited

U.S. PATENT DOCUMENTS

| | | | |
|---|---|---|---|
| 2,922,999 | A | 1/1960 | Carlin |
| 3,138,138 | A | 6/1964 | Quittner |
| 3,612,211 | A | 10/1971 | Clark |
| 4,414,653 | A | 11/1983 | Pettinger |
| 4,475,102 | A | 10/1984 | Troy et al. |
| 4,658,386 | A | 4/1987 | Morris |
| 4,769,794 | A | 9/1988 | Beuter et al. |
| 4,922,468 | A | 5/1990 | Menezes |
| 5,208,787 | A | 5/1993 | Shirley |
| 5,270,707 | A | 12/1993 | Schulte et al. |
| 5,341,762 | A | 8/1994 | Peterson |

| | | | | |
|---|---|---|---|---|
| 5,602,523 | A | 2/1997 | Turchioe et al. | |
| 5,892,446 | A | 4/1999 | Richard | |
| 6,014,448 | A | 1/2000 | Alton | |
| 6,016,100 | A | 1/2000 | Boyd et al. | |
| 6,250,255 | B1 | 6/2001 | Lenhardt et al. | |
| 6,575,597 | B1 | 6/2003 | Cramer et al. | |
| 6,625,918 | B2 | 9/2003 | Bhullar | |
| 6,718,681 | B2 | 4/2004 | Bhullar | |
| 6,793,364 | B2 | 9/2004 | Cramer et al. | |
| 7,052,348 | B2 * | 5/2006 | Price | B63H 5/02 |
| | | | | 441/136 |
| 7,173,534 | B1 | 2/2007 | Markham et al. | |
| 7,227,452 | B1 | 6/2007 | Frost | |
| 7,506,815 | B2 | 3/2009 | Spiegel | |
| 7,671,749 | B2 | 3/2010 | Alvarado | |
| 7,699,018 | B2 | 4/2010 | Wells | |
| 7,958,666 | B2 | 6/2011 | Rogers | |
| 8,093,994 | B2 * | 1/2012 | McGaughy | B60Q 5/00 |
| | | | | 340/573.2 |

(Continued)

FOREIGN PATENT DOCUMENTS

| | | | | |
|---|---|---|---|---|
| CN | 113693056 | A | * 11/2021 | |
| DE | 202012001240 | U1 | * 5/2012 | A01K 75/00 |

(Continued)

*Primary Examiner* — Kristina M Deherrera
*Assistant Examiner* — Evan Mancini
(74) *Attorney, Agent, or Firm* — Cook Alex Ltd.

(57) ABSTRACT

According to the present disclosed waterfowl control device, there is provided an apparatus and system for repelling waterfowl including a powered annunciator for disposition about a body of water where waterfowl are present, a circuit board is disposed in the housing with a processor device coupled to a circuit board. The system may be self-contained or controlled by remote driver circuitry. The apparatus powered annunciator discourages waterfowl from remaining in the feeding area.

20 Claims, 5 Drawing Sheets

(56) References Cited

U.S. PATENT DOCUMENTS

| | | | |
|---|---|---|---|
| 8,667,930 B2 | 3/2014 | Horning | |
| 9,474,265 B2 | 10/2016 | Duncan et al. | |
| 9,521,838 B2 | 12/2016 | Donoho | |
| 9,775,337 B2 | 10/2017 | Duncan et al. | |
| 10,045,525 B2 | 8/2018 | Husseiny et al. | |
| 10,524,465 B2 | 1/2020 | Kovarik | |
| 2007/0193498 A1* | 8/2007 | Wells | A01M 29/10 |
| | | | 116/22 A |
| 2017/0164603 A1* | 6/2017 | Kovarik | A01M 29/16 |
| 2018/0263237 A1* | 9/2018 | Bouler | H02J 7/35 |
| 2020/0187487 A1 | 6/2020 | Kavarik et al. | |

FOREIGN PATENT DOCUMENTS

| | | | | | |
|---|---|---|---|---|---|
| FR | 2896955 A1 * | 8/2007 | | | A01K 79/02 |
| KR | 20180001429 A * | 2/2017 | | | |
| WO | WO-2015121409 A1 * | 8/2015 | | | A01K 79/02 |

* cited by examiner

DEVICE FOR CONTROLLING UNWANTED WATER-FOWL

FIELD OF THE DISCLOSURE

The present disclosure relates to apparatuses for humanely repelling waterfowl from ponds and lakes where their presence is undesirable for health, safety, water, or land use reasons.

BACKGROUND

Waterfowl have a desirable role in the natural order and can provide enjoyment to many. However, they sometimes have a detrimental impact on human land and water use practices and negatively impact surrounding crops, water sources, pastures and spring seedlings, resulting in potentially reduced crop yields. Furthermore, in the NTSB report on the ditching of US Airways flight 1549 in 2009 after striking a flock of Canadian Geese, the Federal Aviation Administration estimates wildlife strikes cost the US aviation industry over 600 million dollars annually. The same report indicates that the Canadian goose population has increased from 1.2 million in 1970 to 5.5 million in 2008. More recent data shows the population near 7.0 million in 2020.

With this increase in the raw population of waterfowl, it is desirable to provide an economical and humane apparatus and method to discourage the presence of undesirable waterfowl in certain locations while leaving them unharmed to move to areas where health, safety or other concerns are not present.

There have been many attempts at products and solutions to rid areas of unwanted waterfowl. Apparatus are known that are located on or near one or more areas of a pond or lake and emit a flashing light in the area where geese sleep thus preventing the geese from resting. While this approach may be effective, an array of blinking lights may disturb the nighttime visual appeal of ponds and lakes and cause confusion in pilots of low flying aircraft. Other products suffer from potentially high maintenance, such as spraying with liquid repellent and re-spraying days later. Additional products such as installing loudspeakers to emit various wildlife stress inducing sounds in the area can be even more burdensome than the disadvantages of the waterfowl. Additional alternative solutions involve planting buffers of 8 to 10 feet around the water, the placement of decoys or other predators such as dogs or hunters. Other alternatives require the installation of fencing or string near the shoreline to discourage flight into and out of the lake. Many of these solutions are costly, labor intensive, ineffective or spoil the appearance or utility of the lake or pond area.

Accordingly, the disclosed water-fowl control device overcomes the above disadvantages.

SUMMARY

Water-fowl hearing is optimized at 2,000 to 3,000 Hz from a total range of approximately 300 to 8,000 Hz. Owing to its density, water is an excellent medium for transferring sounds in the frequency range heard by waterfowl. Countless annunciating devices exist that are capable of reproducing low fidelity sounds in this frequency range. When an annunciating device is placed into an enclosure suitable for a wet environment and provided with a power source such as solar power, a device suitable for repelling waterfowl can be inexpensively manufactured.

To these ends, a preferred embodiment of the disclosed water-fowl control device stems from the principle that water-fowl will not stay where they are exposed to sounds from unexpected sources. Apparatus and methods according to the disclosed waterfowl control device provide interruption to the comfort of waterfowl that are feeding or resting in the area enveloped by the waterfowl control device, causing water-fowl to depart the area in which the apparatus and methods are deployed, according to the waterfowl control device.

Accordingly, one embodiment of the waterfowl control device includes an annunciator coupled to a flotation housing. The annunciator is electrically driven by electronic circuitry consisting of a power circuit, memory circuit, control circuit, and amplifier circuit. In an embodiment, the power circuit is kept at appropriate levels by a solar cell and a storage battery. Alternately, the power circuit is kept at appropriate levels by an external voltage source that is directly connected to the device or may be inductively coupled to provide power through a watertight housing.

Alternately, the power circuit is kept as appropriate levels by a long-life battery that is operatively connected to the annunciating device.

The annunciator, memory circuit, control circuit, and amplifier are designed to work cooperatively to produce a sound at repeating and/or random intervals. The generated sound travels through the water and is felt and heard by the water-dwelling waterfowl. Various sounds including prerecorded distress calls, gunfire sounds like shotgun blasts, predatory animal sounds and certain pop music such as Gershon Kingsley's "Hot Buttered Popcorn" have been found to be very effective. Optionally, an eccentric gear motor, solenoid or the like may also be operatively coupled to the control circuit to serve as a motion or displacement generator. Used in conjunction or independent of the annunciation device, the displacement generator provides motion to the apparatus, further enhancing its usefulness in discouraging waterfowl from coining close to it. The generator may also move the apparatus tether in a quick or sudden fashion thus further enhancing its usefulness. Encapsulation or similar means are used to ensure the electronics remain waterproof.

After installation, the apparatus operates autonomously, and does not require additional adjustment unless desired by the operator. The structure is built with sufficient strength and watertight encapsulation to withstand the typical stresses associated with a device placed outdoors in an inland body of water. Depending on the needs of the installation, the annunciating may take place at fixed or random intervals during periods of daylight or night-time. Typically, the annunciating device will be engaged at ten minute intervals with random intervals as desired. This combination has been found to be sufficiently conservative of power so as not to make the overnight battery storage unnecessarily large and costly. The unexpected sounds disturb the water-dwelling waterfowl during their feeding cycle and the waterfowl direct their attention to the direction of the sound and motion. Deterred by their constant distraction from feeding, the waterfowl will move to another body of water that is not protected by the apparatus.

Unlike flashing lights, chemicals, and out-of-water audio devices, dogs, firearms and physical barriers, the water directed acoustical energy is undetected by humans and reduces the amount of disturbance to the natural environment. In particular, the apparatus merely floats on the water and delivers acoustical energy directly into the water. The acoustical energy may be optimized by acoustically coupling part or all of the housing to the water, placing flexible emitters directly in contact with the water, or a combination thereof. Sound amplifying chambers can be molded into the housing to reduce the cost and complexity of the annunciating device. Observers standing near the annunciating device in the water are unable to detect the acoustical energy and visually observe a relatively small device floating on the water. Alternately, the unit may be fully submerged and powered directly via storage batteries or cabled to a remote power source.

To assist in monitoring the performance of the annunciating device, cameras and microphones may be molded or connected to the housing to provide viewing of the surrounding areas both above and below the waterline. The cameras and microphones may be connected to a monitoring system via any suitable connection scheme including Wi-Fi, Bluetooth, 900 MHz, direct wire video and networked video. The annunciating devices may be an individual monitor or become part a group of remotely monitored annunciators. To further facilitate monitoring in remote areas, one or more annunciators may be connected together using mesh technology wherein each annunciating device may act as nodes in the network to facilitate communication of the monitoring cameras and microphones.

BRIEF DESCRIPTION OF THE DRAWINGS

These and other objectives and advantages will become readily apparent from the following written description of detailed embodiments of the waterfowl control device and from the drawings in which.

DETAILED DESCRIPTION

Figure 1:
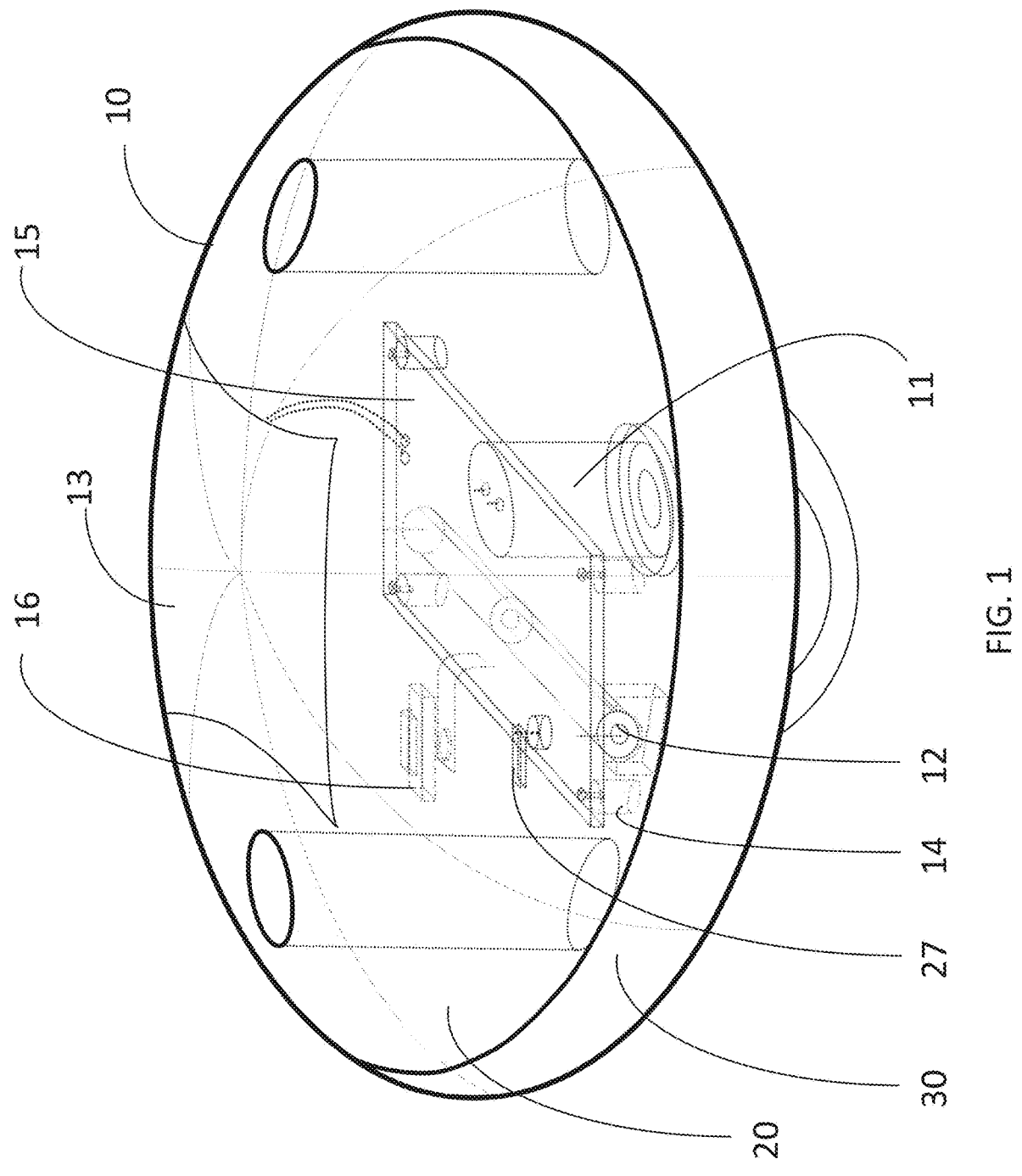
FIG. 1 is a perspective view of one assembled embodiment of the disclosed waterfowl control device.
Figure 2:
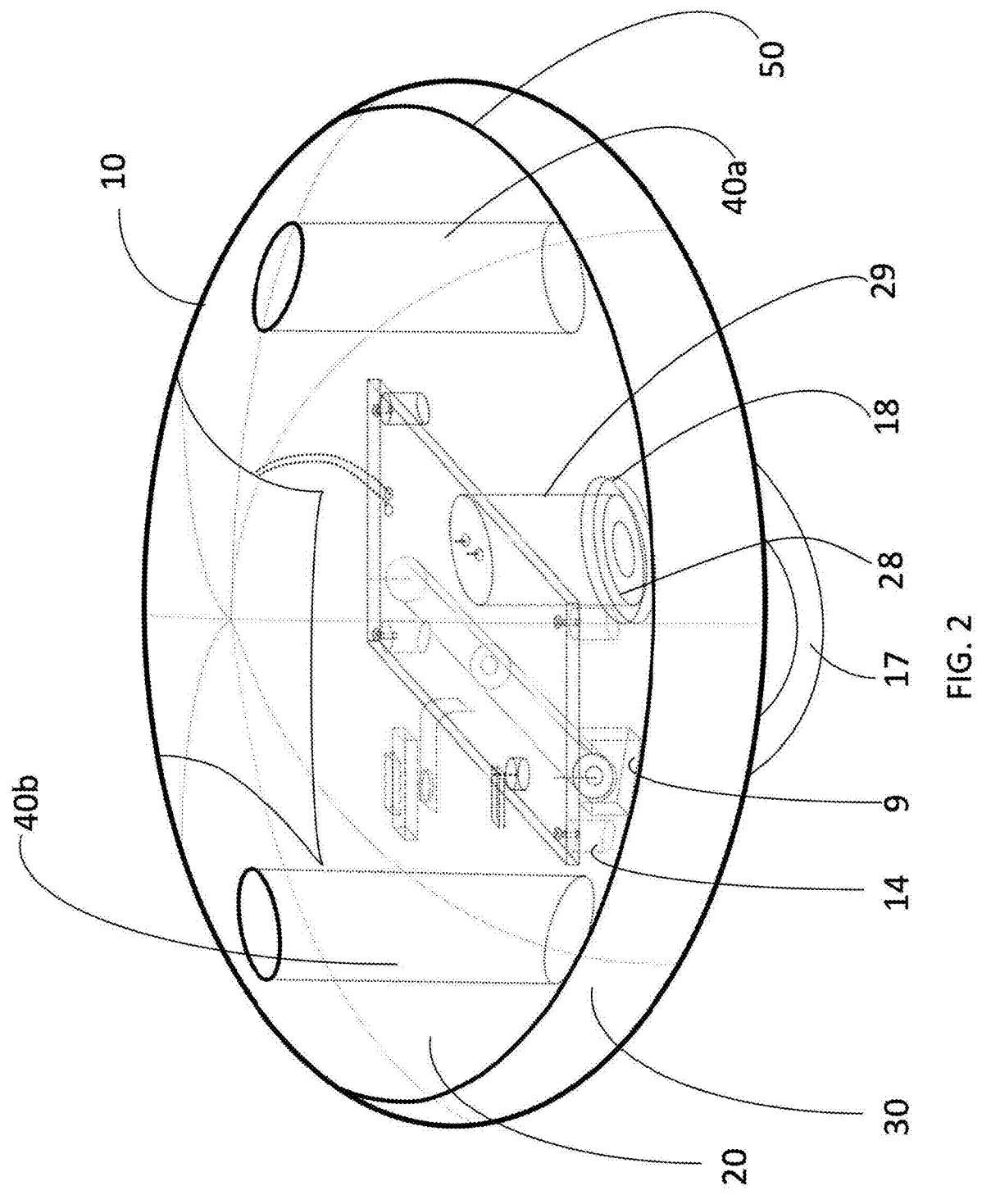
FIG. 2 is a second perspective view of the components of the disclosed waterfowl control device of FIG. 1.

Turning now to FIGS. 1 and 2, a first embodiment of the water-fowl displacement apparatus 10 of the disclosed waterfowl control device is illustrated.

Water-fowl displacement apparatus 10 includes an annunciating device 11 such as a loudspeaker, a piezoelectric device, alarm, buzzer, horn, sounder or other suitable device capable of providing sufficient fidelity in the 300 to 8000 Hz range, a battery assembly 12, a solar panel 13 for charging battery assembly 12, lower housing 30, an upper housing 20 to encapsulate solar panel 13 yet allow sufficient energizing photons to pass through, a circuit holder 14 and circuit board 15, containing circuitry (not shown) for passing electrons from solar panel 13 to battery assembly 12, and for passing a predetermined signal to annunciator 11 to cause the annunciator to emit displacement generating sounds at a predetermined interval when the circuitry is charged to a sufficient operating voltage by solar panel 13 and optional operating switch 16 is engaged in the on position. The circuitry may operate motion generator 27 simultaneously with annunciator 11, or independently at predetermined intervals.

These components are preferably all fashioned into in a watertight, self-contained unit. Flexible membranes can be bonded to the housing or molding with the housing to enhance the coupling of the acoustic annunciating device 11 to the surrounding water. Any other similar combination of such components could be used as will be readily apparent from the disclosure herein. This preferred embodiment is disclosed only as one suitable form of a solar-charged, battery operated annunciating water-fowl displacement apparatus useful as described in this disclosed waterfowl control device.

It will also be appreciated that the on/off switch 16 may be of any design suitable for a water-resistant environment. Examples include magnetic reed switches and membrane switches, or the switch could be omitted, being useful but not necessary for the proper operation of this disclosed waterfowl control device. It will also be appreciated that other energy sources than solar power could be used that are suitable for a water-borne environment such as inductively coupled electrical cable, wave motion, or wind turbine.

Turning now to FIG. 2, the structure of the lower portion 30 of the housing includes anchor attaching eyelet 17, battery retention feature 9, annunciator retention feature 18, electronics retention feature 14, and ballast adjustment feature 40A and 40B. The ballast adjustment feature(s) may be attached to the housing, molded into the housing, added with a suitable material such as iron or steel, or open to the water to allow part of the housing to flood resulting in the desired float level. The primary function of the ballast adjustment feature is to help ensure the upward side of the housing is urged upward after wave, wind or other influences affect the housing orientation. It will be appreciated that the shape, size, quantity or displacement of the ballast adjustment feature(s) can be of any quantity or configuration as long as the net result is the proper buoyancy for the application. For example, a waterfowl displacement device intended to be fully submerged will have increased weight or water inlet to allow the device to remain fully submerged. A device intended to float at the surface will have less weight or water inlet to be of neutral or positive buoyance including being depth constrained by attaching eyelet 17. A device intended to fully float and only be height constrained by the anchor 22 may have little or no ballast or water inlet where the weight of the device itself serves as ballast. Flotation for the water-fowl displacement device is accomplished by sealing upper housing 20 to lower housing 30 at sealing junction 50. The sealing junction may be accomplished by ultra-sonic bonding, heat staking, gluing or any method suitable for joining the assembly. It will be appreciated that the location and shape of sealing junction 50 can be of any shape or size, only limited by the housing size and the opening required to allow the internal components to be installed into the housing. It will also be appreciated that sealing junction may be entirely omitted when the housing is made by over molding techniques well known in the art. By optimizing the size of ballast adjustment feature 40A and 40B, the floating depth of the water-fowl displacement may be optimized to minimize the amount of the device revealed above the water surface, thus maintaining the visual appearance of the body of water while helping to ensure sufficient surface area is in contact with the water to maximize acoustic coupling of the desired distraction sounds. In some embodiments, at least one sound amplifying chamber 29 can be molded into the housing to reduce the cost and complexity of the annunciating device.

Figure 3:
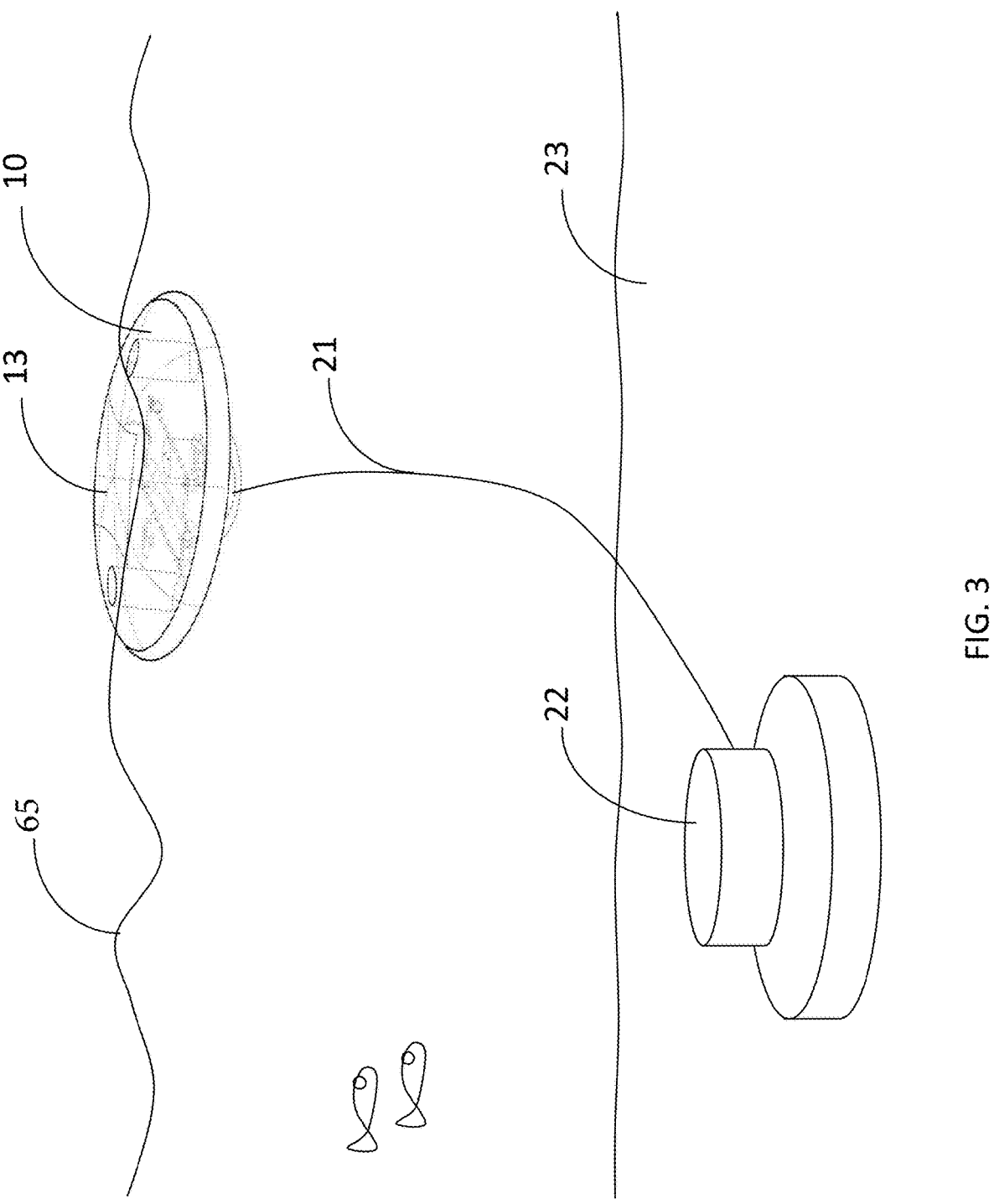
FIG. 3 is an elevation view depicting deployment and use of the disclosed waterfowl control device.

In use, (FIG. 3) once any on/off switch 16 (FIG. 1) is operated into the "on" position, the waterfowl displacement apparatus 10 is placed on the surface 65 of a body of water and floats thereon, preferably anchored through a tether 21 to a weight such as represented by 22 or other suitable anchoring device on the bottom 23 of the body of water. Solar energy is received by the solar panel 13 which converts the energy to electrons and charges the battery 12 (FIG. 1). Once night falls, the battery may continue to operate the device as necessary and then start recharge once sufficient solar energy is available. It may be appreciated that a variety of options in the control circuit or software may direct the device to conserve energy during dark periods and reduce the annunciating interval, or may direct the device to shut down all together. The control circuit may also continue to operate at a predetermined interval during dark periods to accommodate the local feeding habits of the waterfowl.

When the waterfowl displacement apparatus is deployed on a body of water (FIG. 3) on which waterfowl are attempting to feed or rest, the intermittent sounds being produced by annunciator 11 (FIG. 1) discourages the affected waterfowl from feeding comfortably or resting. After a short period of exposure, the waterfowl quickly depart. The departure also breaks the cycle of newly hatched waterfowl choosing the area to return during the next migration cycle.

It will be appreciated for maximum visual appeal, that water-fowl displacement device will be floating with the solar panel 13 above the water surface and the remainder of the device including the flexible membranes below the water surface.

Figure 4:
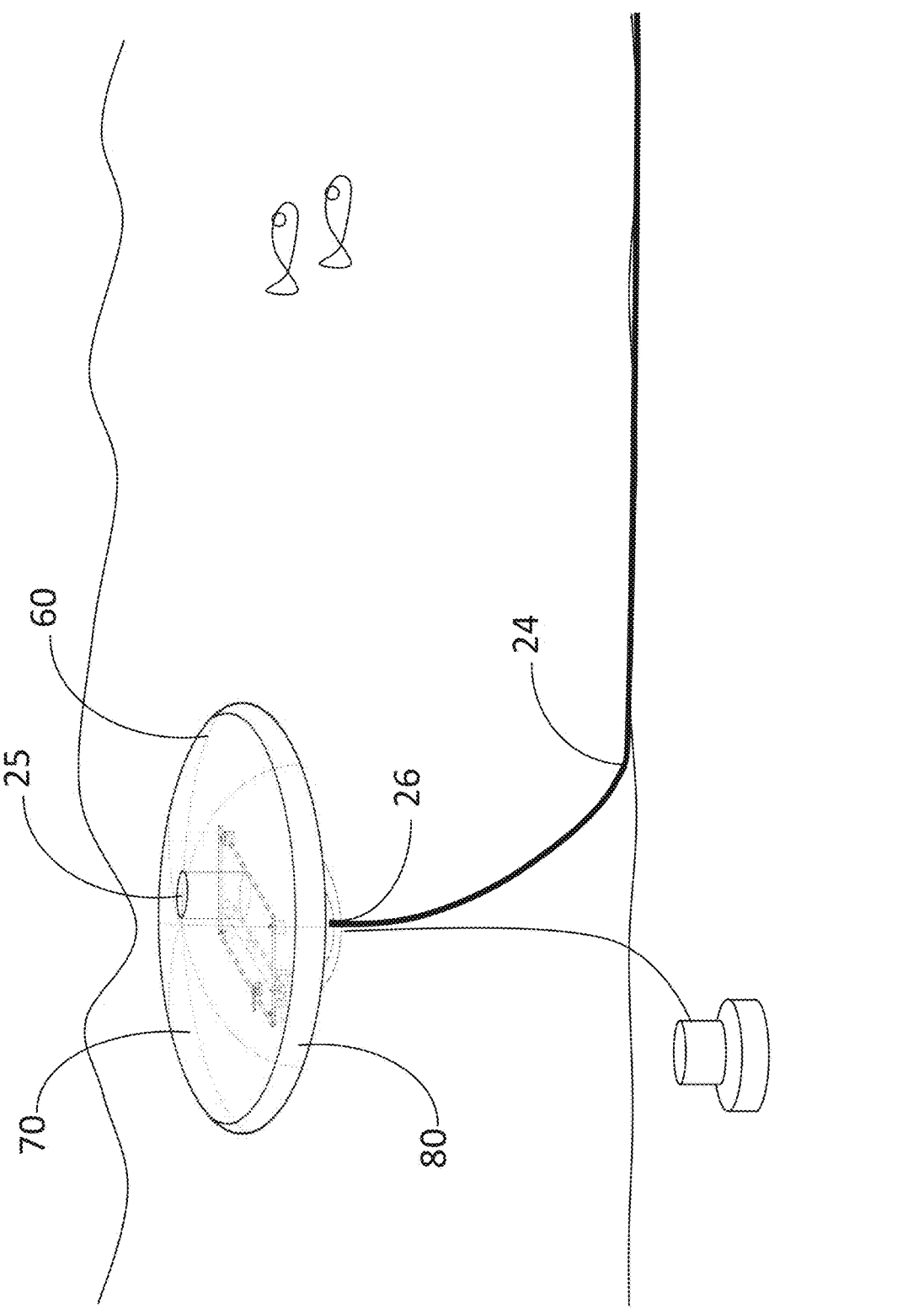
FIG. 4 is an alternative embodiment of the disclosed waterfowl control device, depicting a fully submersible housing and in-water annunciating device.

Turning now to an alternative embodiment as disclosed in FIG. 4 such embodiment is useful when it is desirable to have the water-fowl displacement device at a predetermined submersion level. When submerged, the water-fowl displacement device 60 may be powered from an underwater cable 24 attached either inductively, directly, or with other common methods being beneficial to maintaining a watertight device. Alternative embodiment water-fowl displacement apparatus 60 includes an annunciating device 25 such as a loudspeaker or other suitable device capable of providing sufficient fidelity in the 300 to 8000 Hz range, an upper housing 70 to encapsulate the water-fowl displacement device, lower housing 80 and circuitry (not shown) for passing electrons from the power input 26 or remote land or water based control circuit to annunciator 25 to cause the annunciator to emit displacement generating sounds at a predetermined interval when the annunciator is provided with a signal.

Preferably, the displacement apparatus 60 emits sufficient acoustical energy to disturb waterfowl on a water body of one-half to 10 acres presuming the water-fowl displacement device is submerged in an area with "line of sound" connection to the balance of the body of water. It will be appreciated that the annunciator can be adjusted to smaller or larger bodies of water or more economical energy consumption, or in certain cases, additional devices can be deployed in a large body of water. Additional annunciator or displacement energy may be directed from remotely mounted land or water-born control circuitry. The acoustic coupling properties of the annunciator may be enhanced by placing a water tight flexible membrane 28 as part of the housing surface to enhance acoustic coupling of the generated sound into the surrounding water or manufacturing the entire housing from a flexible membrane to maximize acoustic coupling. Annunciator device 25 may be part of anchor 22 or be present in both the anchor and the disclosed waterfowl displacement device.

Figure 5:
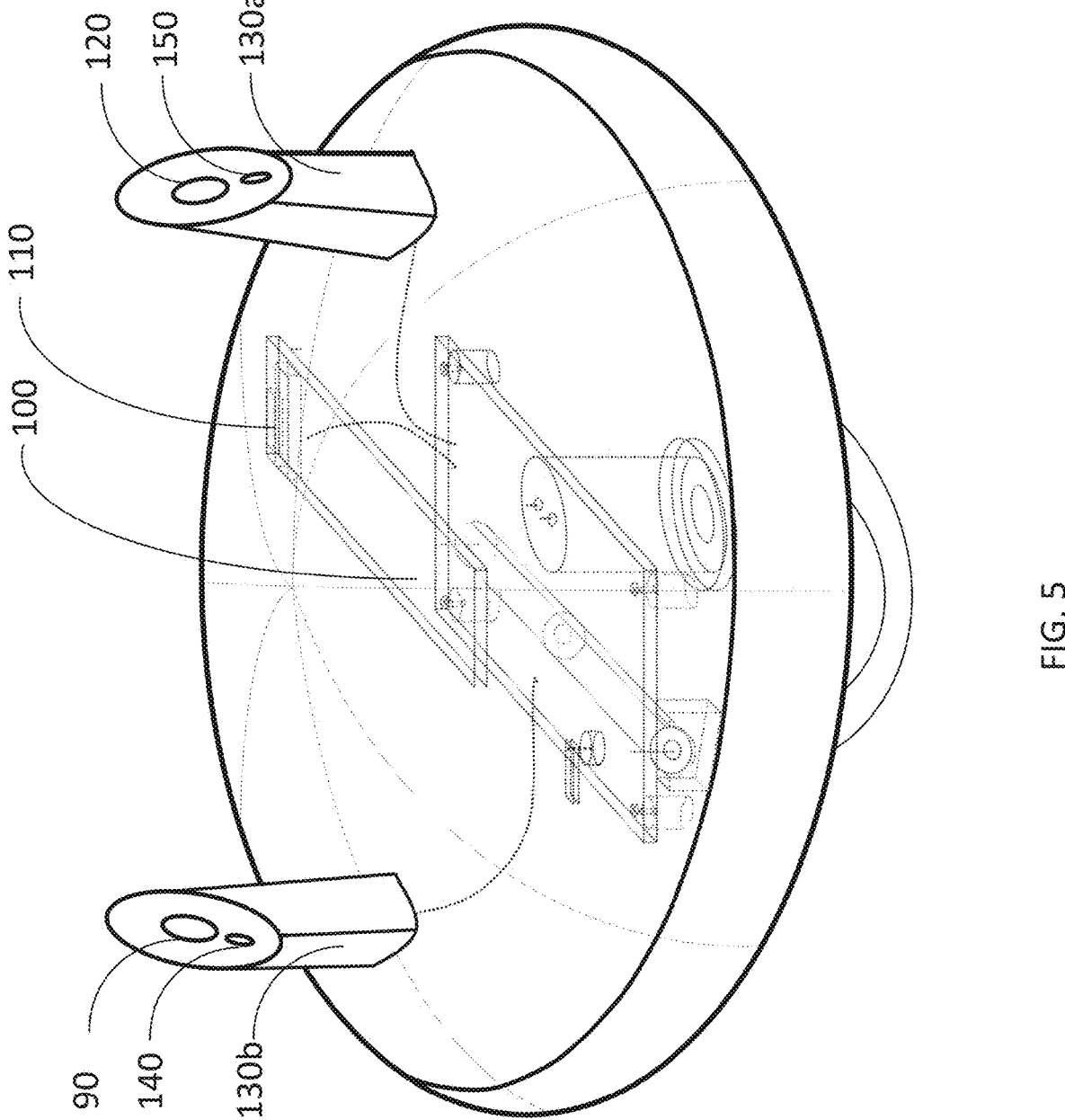
FIG. 5 is an alternative embodiment of the disclosed waterfowl control device, depicting a housing wherein camera and microphones are mouting on the in-water annunciating device.

Turning now to an alternative embodiment as disclosed in FIG. 5. Such embodiment is useful when it is desirable to have monitoring mechanisms for the water-fowl displacement device.

When deployed at the water surface, the waterfowl displacement device may include camera(s) 90, 120 and or microphone 140, 150 in combinations sufficient to provide an encompassing view of the area surrounding the waterfowl displacement device. The cameras 90, 120 and microphones 140,150 may be deployed on standoff 130a and b as necessary to provide sufficient height above the nominal water level. Operatively connected to the cameras and or microphones is communication module 110 and communication control board 100. The module may be of any conventional relatively low power communication design such as Wi-Fi, Bluetooth, 900 Mhz and the like. When operatively connected to communication control board 100, the view provided by the onboard cameras and microphones may be transmitted or stored onboard as desired for reviewing the effectiveness of the waterfowl displacement device. The communication device may operatively connect to other nearby waterfowl control devices in a mesh configuration or to a mobile device such as a smart phone thru an application and cloud system or directly to a remote display as desired by the applicaton.

Thus, an apparatus for repelling waterfowl according to the disclosed waterfowl control device includes intermittently sounding one or more annunciators into bodies of water where waterfowl are feeding or resting, thus encouraging the waterfowl to depart the area for a natural area unprotected by the apparatus. Further, an apparatus for repelling waterfowl includes the steps of converting light energy impinging on a solar panel to charge a battery, automatically generating an appropriate acoustical sound into a small lake or pond at random or intermittent intervals to encourage waterfowl to depart.

These and other benefits and advantages will become readily apparent to those of ordinary skill in the art without departing from the scope of the disclosed waterfowl control device, and applicant intends to be bound only by the claims appended hereto.

What is claimed:

1. An apparatus for repelling waterfowl comprising:
   a sound-emitting device, configured to produce an at least one programmed sound in a sound amplifying chamber, the sound-emitting device located in a floating waterproof housing oriented in alignment with-a surface of a body of water to aid in effective propagation of sound waves through said a body of water;
   a power source;
   a control circuit, disposed within the floating waterproof housing, comprising a microprocessor and memory, the microprocessor configured to retrieve a sound file stored in the memory and cause the sound-emitting device to produce the at least one programmed sound at a programmed interval;
   a ballast feature, disposed within the floating waterproof housing, configured to maintain an upright orientation and buoyancy of the apparatus during operation, ensuring sound coupling with the body of water; and
   a flexible membrane integrated with the sound amplifying chamber configured to enhance acoustic coupling of the at least one programmed sound into said body of water, wherein the at least one programmed sound is within a frequency range of 2,000 to 3,000 Hz which is optimized for water-fowl hearing.

2. The apparatus of claim 1 further comprising:

a motion generation device disposed within the floating waterproof housing and operatively coupled to the control circuit, wherein the motion generation device produces intermittent movement of the floating waterproof housing via an attached tether, creating disturbances in said body of water.

3. The apparatus of claim 1 further comprising a displacement generator configured to create controlled motion of the floating waterproof housing.

4. The apparatus of claim 1 further comprising an inductively coupled power connection disposed on an exterior of the floating waterproof housing for wireless power transfer to the sound-emitting device.

5. The apparatus of claim 1 further comprising an anchor connector affixed to the floating waterproof housing for tethering the apparatus to a fixed position in the body of water.

6. The apparatus of claim 1 wherein said at least one programmed sound is pop music.

7. The apparatus of claim 1 wherein said power source comprises a solar panel and a rechargeable battery, wherein said solar panel is mounted on an upper surface of the apparatus and electrically connected to the rechargeable battery to charge said rechargeable battery during daylight.

8. The apparatus of claim 1 wherein said apparatus emits sound waves parallel to said surface of said body of water.

9. The apparatus of claim 1 wherein said programmed interval is repeating.

10. The apparatus of claim 1 wherein said programmed interval is random.

11. The apparatus of claim 1 wherein said sound-emitting device is an in-water piezoelectric.

12. The apparatus of claim 1 wherein said apparatus is configured to communicate with a second apparatus using mesh network technology, with said apparatus functioning as a node in a mesh network.

13. The apparatus of claim 1 wherein said at least one programmed sound is a predatory animal sound.

14. The apparatus of claim 1 further comprising a camera.

15. A system for repelling waterfowl comprising:

a plurality of waterfowl displacement devices, each device comprising:

a sound-emitting device configured to produce sounds within a frequency range of 2,000 to 3,000 Hz which is optimized for water-fowl hearing;

a power source;

a waterproof housing containing the sound-emitting device and the power source;

a control circuit comprising a microprocessor and memory;

a communication module operatively connected to the control circuit;

a camera for monitoring an area; and a motion generation device disposed within the waterproof housing and operatively coupled to the control circuit, wherein the motion generation device produces intermittent movement of the waterproof housing via an attached tether, creating disturbances in a body of water, wherein the plurality of waterfowl displacement devices are configured to communicate with each other using mesh network technology, with each waterfowl displacement device functioning as a node in a mesh network.

16. The system of claim 15, wherein each waterfowl displacement device further comprises a microphone for monitoring a surrounding area.

17. The system of claim 15, wherein the communication module of each waterfowl displacement device is configured to transmit operational data to a monitoring system via a connection scheme, wherein said connection scheme is selected from Wi-Fi, Bluetooth, 900 MHZ, direct wire video and networked video.

18. The system of claim 15, wherein each waterfowl displacement device is configured to relay communications from other waterfowl displacement devices in the system.

19. The system of claim 15 wherein said sound-emitting device is an in-water piezoelectric.

20. The system of claim 15 wherein waterproof housing includes a molded sound amplifying chamber.

* * * * *